Nov. 1, 1927.    1,647,784
J. D. COLLINS
CROSS CHAIN ANCHORING MEMBER FOR VEHICLE WHEELS
Filed Jan. 19, 1927
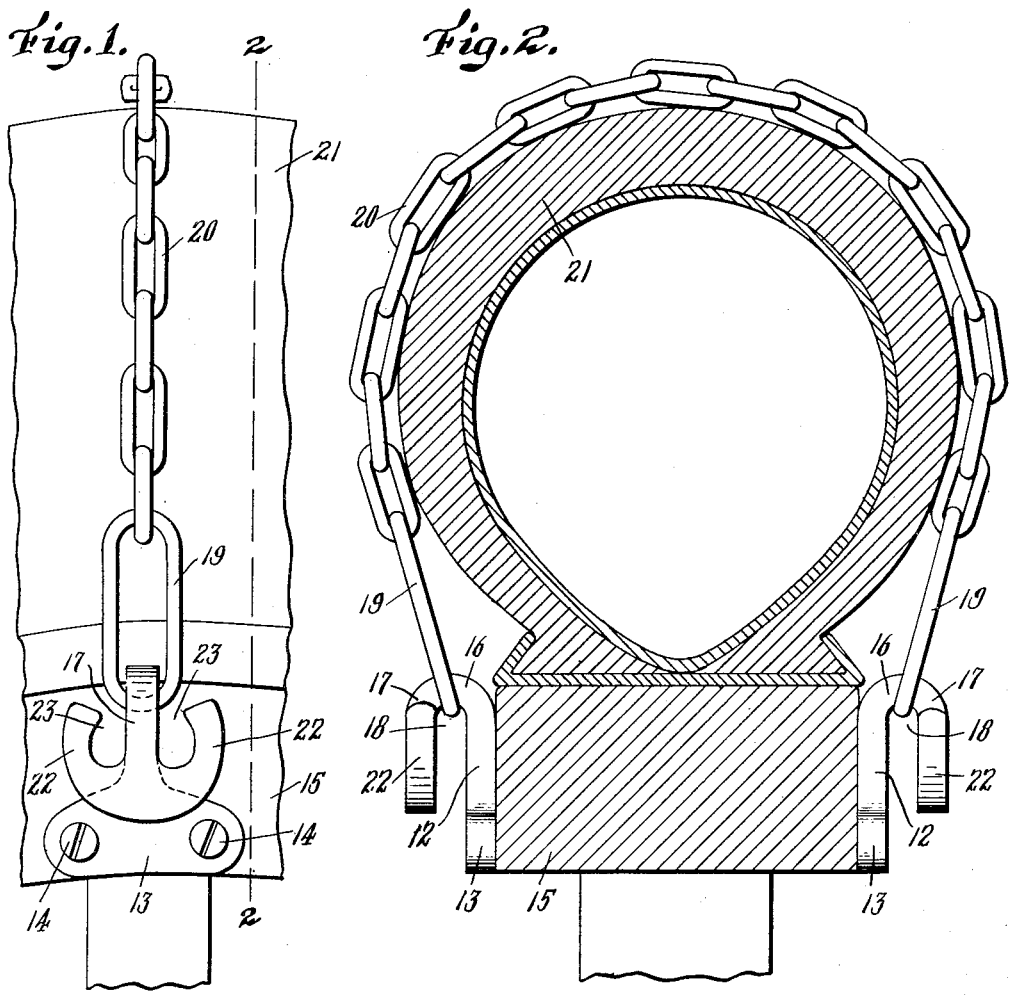
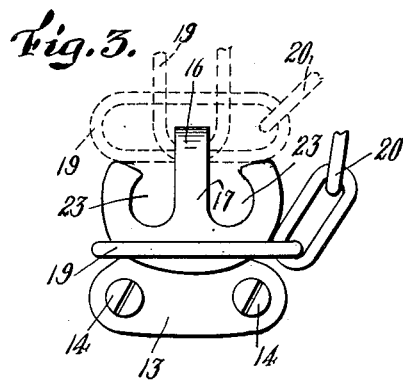
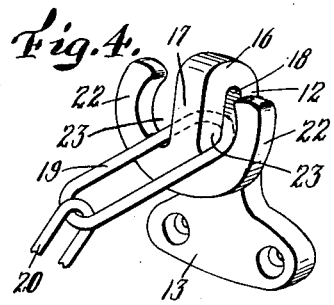
Inventor
James D. Collins
by Wright Brown Quinby May
Attys.

Patented Nov. 1, 1927.

1,647,784

UNITED STATES PATENT OFFICE.

JAMES D. COLLINS, OF WAKEFIELD, MASSACHUSETTS.

CROSS-CHAIN ANCHORING MEMBER FOR VEHICLE WHEELS.

Application filed January 19, 1927. Serial No. 161,983.

This invention relates to means for detachably securing to the opposite sides of a rubber-tired wheel, the end links of an antiskid cross chain which extends across the tread portion of the tire.

The object of the invention is to provide a simple and effective anchoring device adapted to be attached to a wheel adjacent the tire, and to engage an end link of a cross chain in such a manner as to reduce to a minimum liability of accidental disengagement and loss of the chain.

Of the accompanying drawings forming a part of this specification,—

Figure 1 is a fragmentary side view, showing portions of a wheel and a tire, and an anchoring member embodying the invention, attached to the wheel and engaged with a cross chain.

Figure 2 is a section on line 2—2 of Figure 1, and shows in elevation parts at the left of said line.

Figure 3 is a side view of the anchoring member, and illustrates the operation of engaging a terminal link of a cross chain therewith.

Figure 4 is a perspective view, showing the anchoring member and portions of a displaced chain confined thereon.

The same reference characters indicate the same parts in all of the figures.

A cross-chain anchoring member embodying the invention comprises a hook including an inner arm 12, which may be adapted, in any suitable way, for attachment to a wheel. In this instance, the inner arm has an enlargement or shank portion 13, adapted to be attached by screws 14 to a wheel felly 15. The arm may be otherwise formed, and may be adapted for attachment to any suitable part of the wheel.

The hook includes also a neck 16 projecting outward from the inner arm, and from the side of a wheel to which the arm is attached, and an outer arm 17 connected with the inner arm by the neck and extending substantially parallel with the inner arm. The arms 12 and 17, and neck 16, form a throat 18, adapted to receive an elongated link 19, constituting an end member of a cross chain 20, bearing on a tire 21, the closed end of the throat being formed by the neck 16, which constitutes an abutment on which the link 19 bears operatively, as indicated by Figures 1 and 2.

The anchoring member comprises also a U-shaped head joined to the extremity of the outer arm 17, and including two side portions or wings 22, located at opposite edges of the outer arm 17, and in the same plane therewith. The wings and the outer arm form deep throats 23, 23, which are closed at the outer end of the arm 17, and open adjacent the neck 16, and are formed to receive and confine an end link 19 in the position shown by Figure 4. The inner edges of the wings are preferably inclined inwardly at their outer ends, to contract the open ends of the throats 23, and thus more securely confine the end link against accidental removal from the position shown by Figure 4.

It will now be seen that in case the chain is broken at any point between the end links, said links and the portions of the chain connected therewith will be confined on the hooks, as indicated by Figure 4, so that loss of the chain portions will be prevented.

The width of the U-shaped head, or the maximum distance between the outer edges of the wings 22, is such that an end link 19 may be, first, moved across the head, and then operatively engaged with the neck 16. The link is shown by full lines in Figure 3, as being moved sidewise across the head and the outer arm 17. When the link reaches the horizontal dotted line position, it bears on the neck and is then turned to the vertical dotted line position, which is the operative position shown by Figures 1 and 2.

It will be seen that a number of movements must be imparted to the link to operatively engage it with the anchoring member, and that a reversal of the order of these movements is required to separate the link from the member. The chain is secured to the wheel by first, engaging one of the end links with an anchoring member, at one side of the wheel, and then engaging the opposite end link with the other anchoring member. The link first engaged is, of course, free, there being then no tension on the chain. The usual slack considered desirable in a cross chain, is sufficient to permit the necessary movements of the link last engaged, to its operative position. Although the slack may be considerable, when both end links are engaged, this is not likely to cause accidental disengagement of either of the end links. Accidental disengagement of both end links at the same time, is practically impossible. Should one end link become accidentally disengaged from the anchoring member at one side of the wheel, the U-shaped head of the other anchoring member is practically certain to confine the other end link, as illustrated by Figure 4, and prevent the loss of the chain.

I claim:

1. A cross-chain anchoring hook including an inner arm formed to bear on a portion of a wheel and having means for engagement with attaching devices rigidly securing the hook to the wheel, a neck arranged to project outward from the wheel when the inner arm is attached thereto, and an outer arm connected with the inner arm by the neck and extending substantially parallel with the inner arm, said arms and neck forming a parallel-sided link-receiving throat adapted to receive an end link of a cross-chain and closed at one end by the neck which constitutes an abutment for the end link, the outer arm being provided with a U-shaped head joined to its outer extremity and formed to permit movement of an end link over it to an operative bearing on the neck, said head including wings located at opposite edges of the outer arm and in the same plane therewith, said wings and the outer arm forming deep throats which are closed at the outer end of the outer arm, and open adjacent the neck, said throats being formed to receive and confine an end link of a displaced cross-chain and prevent disengagement of said link from the hook.

2. A cross-chain anchoring hook as specified by claim 1, the inner edges of the wings being inclined inwardly at their outer ends to contract the open ends of the throats, for the purpose specified.

In testimony whereof I have affixed my signature.

JAMES D. COLLINS.